United States Patent [19]

Bokelmann

[11] 4,312,827

[45] Jan. 26, 1982

[54] METHOD AND APPARATUS FOR THE MANUFACTURE OF A BALL OF FOAM MATERIAL WITH EMBOSSED SURFACE

[75] Inventor: Horst Bokelmann, Bad Wildungen, Fed. Rep. of Germany

[73] Assignee: Metzeler Schaum GmbH, Memmingen, Fed. Rep. of Germany

[21] Appl. No.: 130,213

[22] Filed: Mar. 14, 1980

[30] Foreign Application Priority Data

Mar. 17, 1979 [DE] Fed. Rep. of Germany ....... 2910640

[51] Int. Cl.$^3$ .................... B29D 27/00; B29C 15/00; B44D 5/10
[52] U.S. Cl. ................................ 264/321; 273/58 A; 425/394

[58] Field of Search ........................ 264/321; 425/394; 273/58 A

[56] References Cited

U.S. PATENT DOCUMENTS 3,069,170 12/1962 Dillon ............................ 264/321 X
3,994,653 11/1976 Marangoni ....................... 425/394 X Primary Examiner—Philip Anderson
Attorney, Agent, or Firm—Herbert L. Lerner; Laurence A. Greenberg

[57] ABSTRACT

Method and apparatus for the manufacture of a ball of foam material with an embossed surface pattern corresponding to the surface marking of a leather ball, which includes marking the surface of the ball in a single operation by simultaneously applying a set of heated embossing tools.

10 Claims, 6 Drawing Figures

METHOD AND APPARATUS FOR THE MANUFACTURE OF A BALL OF FOAM MATERIAL WITH EMBOSSED SURFACE

The invention relates to a method for the manufacture of a ball of foam material having its surface embossed with a pattern corresponding to a leather ball, such as a soccer ball for example, and to the apparatus for performing the method.

In the manufacture of balls of synthetic materials, preferably made of foam material, it is advantageous to provide these balls of synthetic material with surface-embossing corresponding to the surface contour of a sport-ball of leather, or the like. This is described, for example, for a tennis ball made of foam material in German Petty Pat. No. DE-GM 77 30 61, or in co-pending U.S. patent application Ser. No. 83,238, filed Oct. 10, 1979; one of the inventors of that application being the inventor of the instant application. With that invention, a continuous contour line is burned-in by a rolling-off operation with a suitably heated wire.

However, difficulties arise with this method when manufacturing balls having a more complicated pattern embossed therein, as is the case, for example, with soccer balls, the surface of which is subdivided into several subdivisions with their orientation to the ball circumference varying. Disregarding the difficulty of obtaining an exact rotation, a relatively long time is required to mark the whole surface by a rolling-off operation.

It is accordingly an object of the invention to provide a method and apparatus for the manufacture of a ball of foam material which overcomes the hereinafore mentioned disadvantages of the heretofore known devices of this general type, and to make it possible to obtain the precise surface embossing of a ball of foam material in a simple manner, quickly, and without complicated, time-consuming motion sequences, with a simple, economically constructed apparatus.

With the foregoing and other objects in view there is provided, in accordance with the invention, a method for the manufacture of a ball of foam material with an embossed surface pattern corresponding to the surface marking of a leather ball, which comprises marking the surface of the ball in a single operation by simultaneously applying a set of heated embossing tools.

In accordance with another mode of the invention, there is provided a method which comprises marking the ball with a pattern corresponding to a soccer ball.

In accordance with a further mode of the invention, there is provided a method which comprises retracting an upper tool head, depositing the ball to be marked in a receiving position on a ball guiding element with a transfer and feeding mechanism from above the working position, and subsequently bringing the ball into a working position by simultaneously lowering the guiding element and the upper tool head, where the upper tool head and other tool heads are equidistant from the ball.

In accordance with an added feature of the invention, there is provided an apparatus for performing a method for the manufacture of a ball of foam material with an embossed surface pattern corresponding to the surface marking of a leather ball, comprising a ball guiding element for moving a ball to be marked between a receiving position and a working position having the imaginary shape of a ball, a multiplicity of heatable embossing tools, at least some of the embossing tools being simultaneously radially movable along three coordinates like rays from a position equidistant from the periphery of the working position toward the center thereof which is also the center of the apparatus, the multiplicity of embossing tools including an upper embossing tool being retractable by transfer and feeding means and being simultaneously movable from a retracted position to the equidistant position when the guiding element moves the ball from the receiving position to the working position.

In accordance with an additional feature of the invention, each embossing tool includes an electrically heatable embossing head including embossing bars, the embossing bars being contoured and aligned to match the spherical shape of the ball, so that all of the bars together form the shape of the ball.

In accordance with yet another feature of the invention, the multiplicity of embossing tools includes six identical embossing tools mutually spaced apart about the circumference of the working position by 90° whether viewed in the horizontal or vertical plane with the embossing bars of different embossing tools being vertically and horizontally disposed, each embossing tool with horizontally disposed embossing bars being surrounded by embossing tools with vertically disposed embossing bars and vice versa.

In accordance with yet a further feature of the invention, the multiplicity of embossing tools includes a lower embossing tool, and the ball guiding element includes three vertically movable rods which are retractably guidable through the lower embossing tool.

In accordance with yet an added feature of the invention, there is provided a table, and the multiplicity of embossing tools includes five movable embossing tools and a lower embossing tool being immovably secured to the table and forming a lower boundary of the working position.

In accordance with yet an additional feature of the invention, in a building block-type construction, the multiplicity of embossing tools includes a middle set of embossing tools and a lower embossing tool, the middle set of embossing tools including separate identical holding, activating and securing means, and the upper and lower tool heads and the ball guiding element include separate identical operating, holding and vertical guide means. This is particularly advantageous, not only at first for the manufacture of the apparatus, but also for storage of eventually-required spare parts.

In accordance with a concomitant feature of the invention, there are provided piston and cylinder means for moving the embossing tools.

The method according to the invention can also be performed in a slightly modified way, wherein the lower embossing tool is secured immovably to the table of the device, while the whole vertical transfer motion is performed by the ball-guiding elements. Thereby the embossing operation is carried out in two steps which rapidly follow each other. The ball is first brought to the working position through the ball-guiding-element while simultaneously lowering the upper tool, and thereafter the surface of the ball is embossed by simultaneously feeding the four middle and the upper tool heads under simultaneous retraction of the guide rods.

The apparatus according to the invention can, in the most simple manner, be incorporated into an automated manufacturing plant, if a suitable transfer and feeding mechanism is provided for placing the work on, and removing the work from, the device according to the invention. In this way, the removal of the finished, embossed ball, and its transfer thereafter, may possibly be performed by the same transfer and feeding mechanism.

Other features which are considered as characteristic for the invention are set forth in the appended claims.

Although the invention is illustrated and described herein as embodied in a method and apparatus for the manufacture of a ball of foam material with embossed surface, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
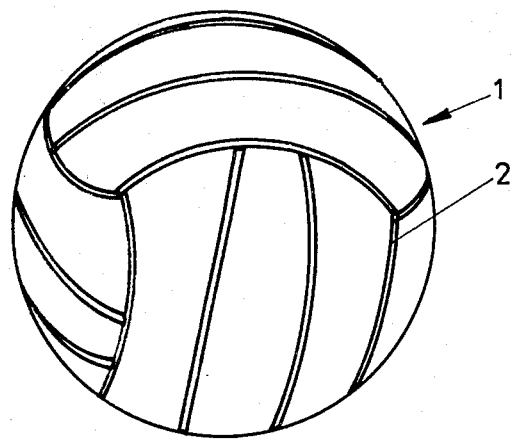
FIG. 1 is a diagrammatic view of a ball of foam material with suitable surface embossing, in accordance with the invention.

Referring now to the figures of the drawing as a whole, it is seen that FIG. 1 shows a ball 1 having an embossed surface 2, which is produced by the apparatus according to the invention, as shown in detail in FIGS. 2 to 6. By using this invention, the pattern of the embossed grooves simulates the pattern of the seams of a leather ball.

Figure 5:
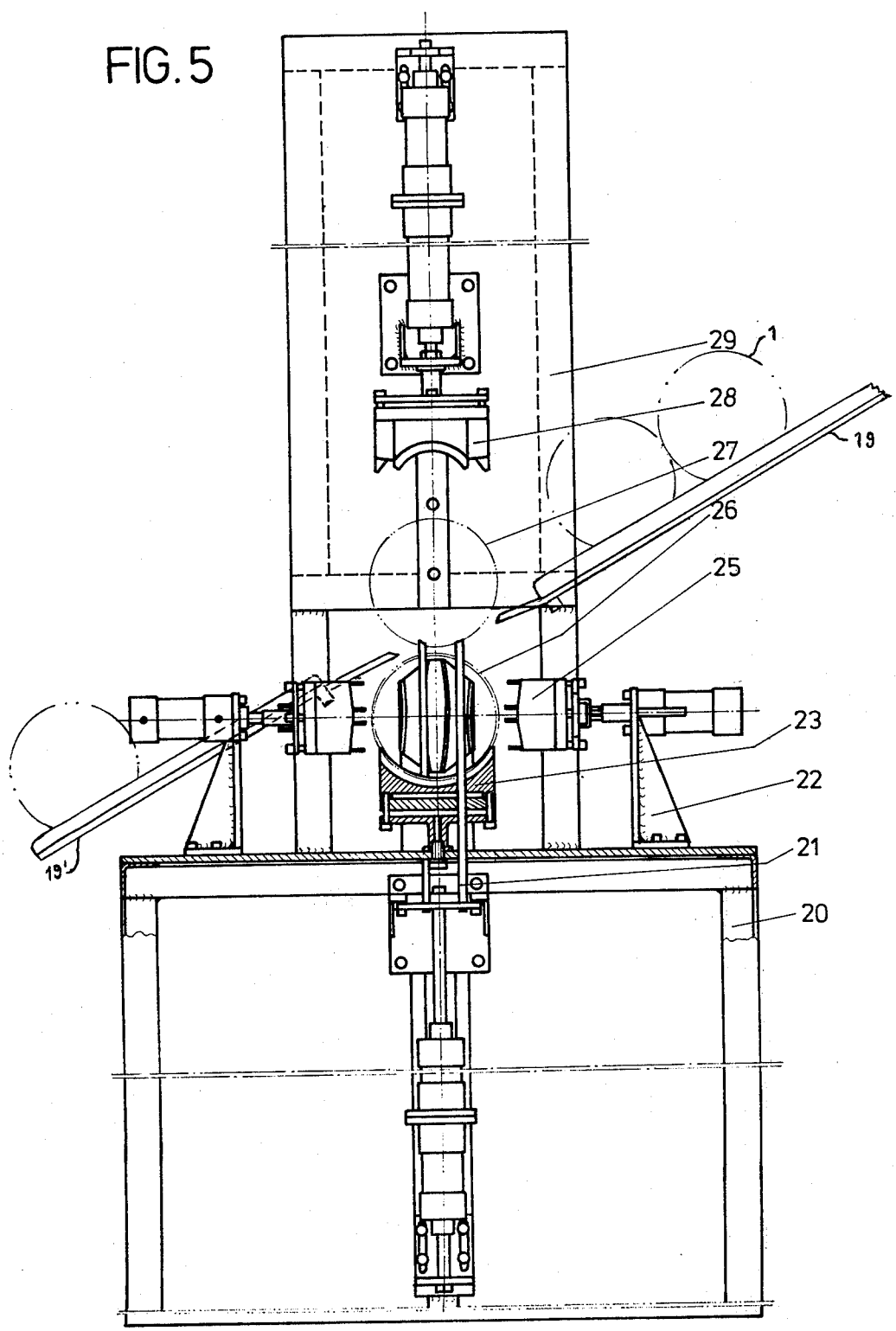
FIG. 5 is a diagrammatic front-elevational view of the apparatus according to the invention.
Figure 6:
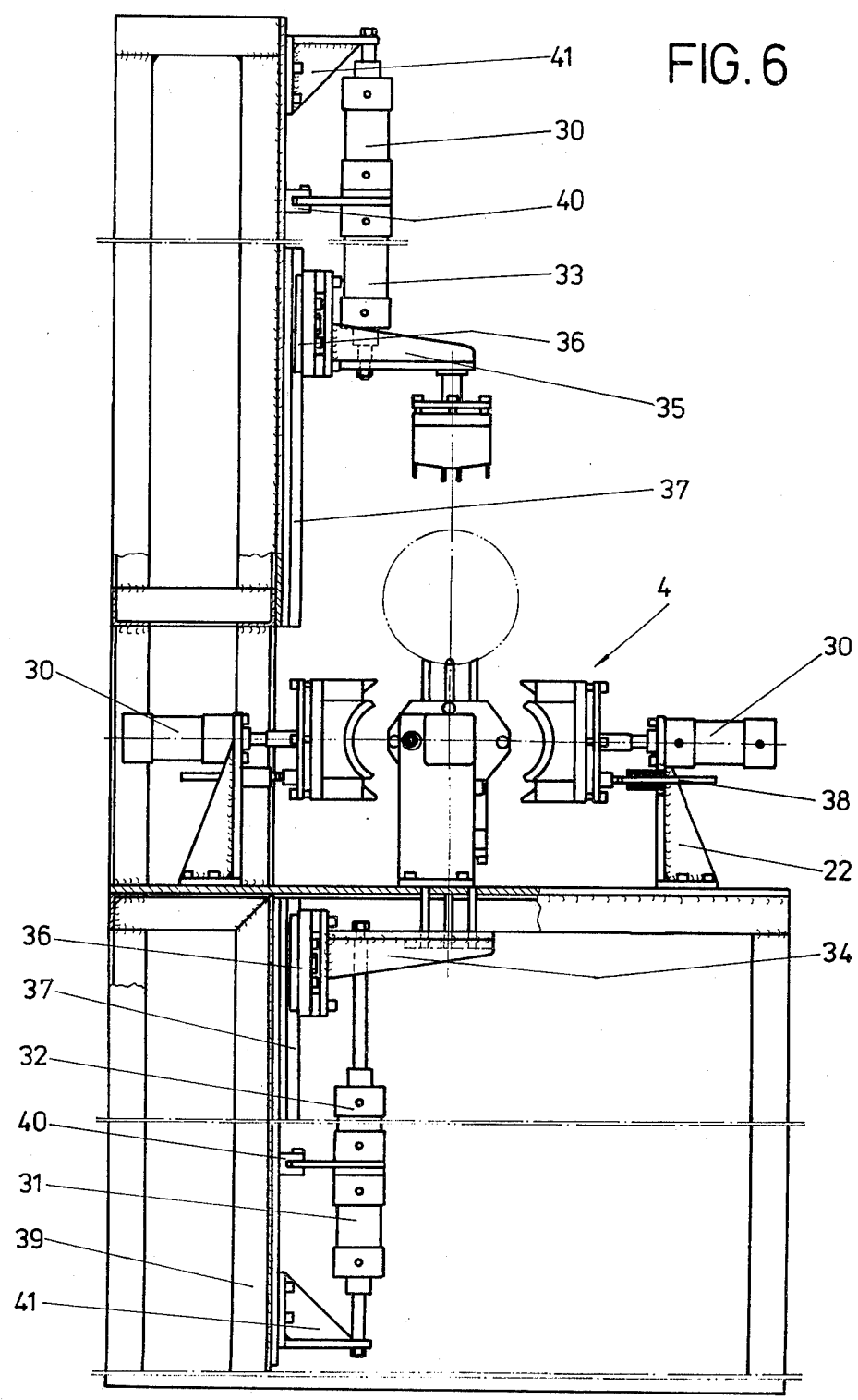
FIG. 6 is a side-elevational view of the apparatus according to the invention shown in FIG. 5.

The device according to the invention includes, as can be most easily seen from FIGS. 5 and 6, a table 20 with a high, upright vertical carrier 29, both of which are made as a welded assembly of suitable construction sections.

On the upper surface of the table 20, four brackets 22, which are equally spaced from the center of the table are screwed down. Each of the brackets 22 is provided at its upper end with a cylinder 30, having piston rods that point toward the center point of the apparatus and a middle tool head 25 secured thereto. The tool heads are exactly positioned and aligned by a guide 38. A lower tool head 23 is secured on the table plate 20 with its working side pointing perpendicularly upward, in such a manner that the ball 1, when in work, rests on the lower tool head 23 exactly in the position 26 in which it is to be worked on. Furthermore, an upper tool head 28 is provided, which is shown in the withdrawn position in the drawing. In this position the upper tool head 28 opens the receiving position 27 of the ball 1 which is to be worked on. In the receiving position 27, the ball 1 which is to be worked on is held by a ball-guiding-element 21, that is formed by three rods which can move vertically. The three rods of the ball-guiding-element 21 extend through the lower tool head 23, and are also secured to a lower holder bracket 34. This lower holder bracket 34 is essentially similar to an upper holder bracket 35, to which the upper tool head 28 is fastened. Each holder bracket 34 and 35, respectively, is secured on vertical guides 36, which themselves are slideably disposed in vertical guide rails 37. Cylinders 32 and 33 are each fastened in the same way at one end thereof to the holder brackets 34 and 35, respectively, by their piston rods, but pointing in opposite directions. At the other end of the cylinders 32 and 33, the axial ends of cylinders 30 and 31, respectively, are joined to them with a suitable flange. The piston rods of these cylinders 30, 31, each of which point toward the outside of the apparatus, are fastened to brackets 41, which themselves are screwed to the vertical carrier 29, and a vertical reinforcement 39, respectively. The vertical alignment is assured by a guide member 40, which is fastened to the flanges of the cylinders that are coupled to each other. The cylinders 32 and 33 are essentially the same, i.e. they have the same stroke, however in an opposite operating mode, so that when the cylinder 33 is retracted, for example, the cylinder 32 is in the extended position. The cylinders 30 of the four middle tool heads 25, and the upper tool head 28 are each identical to the cylinder 31, i.e. they have the same stroke; the only difference is that the cylinder 31 is in an opposite operating mode compared to cylinder 30, so that when they are operated the cylinders 30 cause a motion of the tool heads in the direction toward the working position 26, while simultaneously the cylinder 31 causes a motion to the outside and a retracting motion of the ball-guiding element 21 downward.

Figure 2:
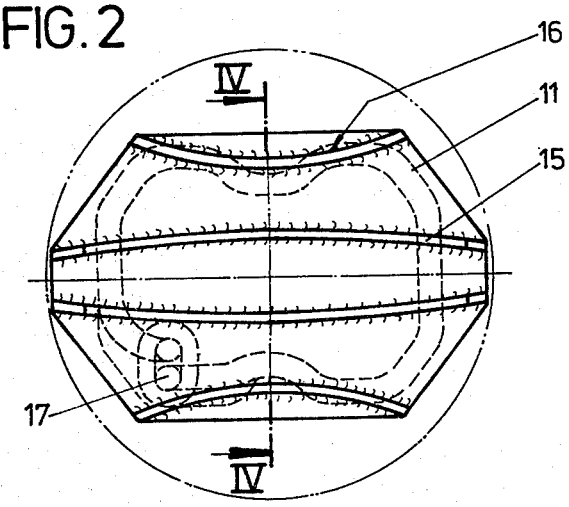
FIG. 2 is a diagrammatic front-elevational view of an embossing head according to the invention.
Figure 3:
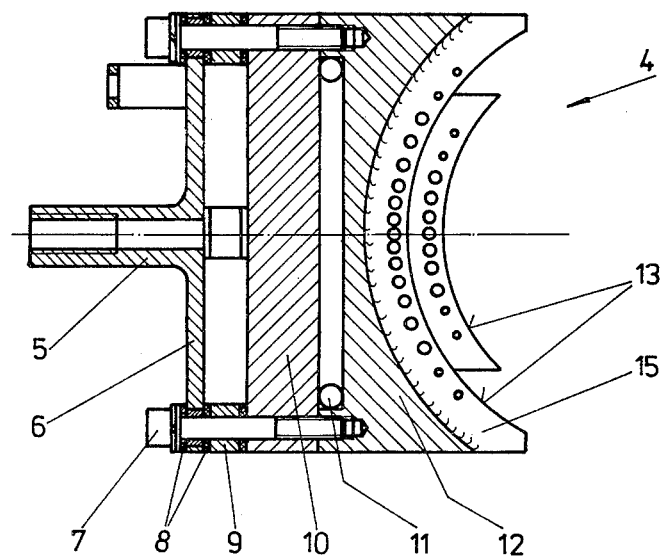
FIG. 3 is an axial cross-sectional view of the embossing head, taken along the line III—III of FIG. 4, in the direction of the arrows.
Figure 4:
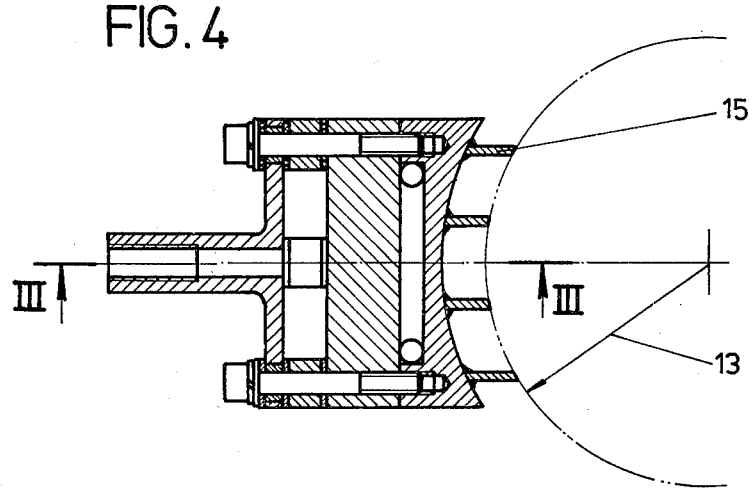
FIG. 4 is an axial cross-sectional view of the embossing head rotated through 90° from FIG. 3, taken along the line IV—IV of FIG. 2, in the direction of the arrows.

The tool heads 23, 25 and 28 each are identical embossing heads or burn-heads 4, which are shown in detail in FIGS. 2, 3 and 4. The embossing head 4 includes an active part—the actual tool 12—which has at its active side four bars 15 that run essentially in the same direction, and have a longitudinal curve 13. These bars 15 are in and of themselves, and also in relation to each other, profiled to form a spherical shape, so that they evenly follow the contour of the ball surface during the work. The tool 12 is provided with a recess at the side opposite the active side, in which a heating coil 11 is disposed near the outer contour of the tool. Electrical connections 17 provide this heating coil 11 with suitable current. The tool 12 is secured to a cover 6 by means of screws 7 through an insulating plate 10 and suitable spacer bushings 9. Therefore, in each case insulating discs, such as round mica washers, are provided between the insulating plate, the spacer bushings, the cover, and the screw heads. The cover 6 has a central boss 5 which is provided with an internal thread for fastening it to the piston rod, for example.

The apparatus shown in the drawing functions as follows: When the apparatus is ready to operate, i.e. when the embossing heads are heated to the right temperature, the ball to be worked on is brought to the receiving position 27 with the aid of a transfer and feeding device 19, which is more fully described in my co-pending application Ser. No. 116,791 filed on Jan. 30, 1980, or by hand, whereby the ball rests on the rods of the ball guiding element 21. The operation is now started by this feeding device 19 either by hand, or by timing arrangements. Accordingly, first the cylinders 32 and 33 are supplied with air pressure, which causes simultaneous downward motions of the two holder brackets 34 and 35, that in turn move the upper embossing head, and the ball-guiding element 21 downward.

This downward motion is adjusted so that the ball is thereby moved from the receiving position 27 to the working position 26, and simultaneously the upper embossing head 28 comes to a stop at the same distance from the surface of the ball as the middle embossing heads 25. Now after reaching the working position 26, the cylinders 30 and 31 are activated by operating a switch, so that on the one hand the ball guiding-element 21 positions the ball on the lower embossing tool 23 by means of the cylinder 31, and simultaneously, on the other hand, the four middle embossing heads 25 and the upper embossing head 28 are quickly moved in by the cylinders 30, so that the surface embossing 2 is quickly burned-in or embossed in the surface of the ball 1. Depending how much the embossing tool is heated, the effective embossing time may be very short, so that the tools can be immediately withdrawn and the ball can be lifted from the lower embossing head, so that immediately thereafter the ball is raised to the receiving position 27 and the upper embossing head 28 is raised. The finished ball is finally lifted from the rods of the ball guiding-element 21, either by hand, or by automatic means, possibly by pushing the ball directly into a following transfer device 19' by feeding a new ball from the feeding mechanism 19.

The construction of the invention, particularly of the apparatus according to the invention, is not limited to the described sample embodiment. Instead of being driven pneumatically, the embossing heads can be driven by purely mechanical means, such as linkages, gears, or the like. The embossing tools can also be heated by other means, for example by normal net current with high frequency currents, which makes a rapid heating of the embossing tools possible in the moment when they reach the working position.

There are claimed:

1. Method for embossing the surface of a ball of foam material with an embossed surface pattern corresponding to the surface marking of a leather ball, which comprises burning the pattern into all areas of the surface of the ball to be marked in a single operation by simultaneously radially applying each one of a set of heated burning tools to a predetermined region of the surface of the ball.

2. Method according to claim 1, which comprises marking the ball with a pattern corresponding to a soccer ball.

3. Method for the manufacture of a ball of foam material with an embossed surface pattern corresponding to the surface marking of a leather ball, which comprises marking all areas of the surface of the ball to be marked in a single operation by simultaneously applying a set of heated embossing tools, retracting an upper tool head, depositing the ball to be marked in a receiving position on a ball guiding element with a transfer and feeding mechanism from above the working position, and subsequently bringing the ball into a working position, by simultaneously lowering the guiding element and the upper tool head, where the upper tool head and other tool heads are equidistant from the ball.

4. Apparatus for performing a method for the manufacture of a ball of foam material in a single operation with an embossed surface pattern on all areas of the surface to be marked corresponding to the surface marking of a leather ball, comprising a ball guiding element for moving a ball to be marked between a receiving position and a working position having the imaginary shape of a ball, a multiplicity of heatable embossing tools, at least some of said embossing tools being simultaneously radially movable from a position equidistant from the periphery of the working position toward the center thereof, said multiplicity of embossing tools including an upper embossing tool being simultaneously movable from a retracted position to said equidistant position when said guiding element moves the ball from said receiving position to said working position.

5. Apparatus according to claim 4, wherein each embossing tool includes an electrically heatable embossing head including embossing bars, said embossing bars being contoured and aligned to match the spherical shape of the ball.

6. Apparatus according to claim 4, wherein said multiplicity of embossing tools includes six identical embossing tools mutually spaced apart about the circumference of said working position by 90° with said embossing bars of different embossing tools being vertically and horizontally disposed, each embossing tool with horizontally disposed embossing bars being surrounded by embossing tools with vertically disposed embossing bars and vice versa.

7. Apparatus according to claim 4, wherein said multiplicity of embossing tools includes a lower embossing tool, and said ball guiding element includes three vertically movable rods which are retractably guidable through said lower embossing tool.

8. Apparatus according to claim 4, including a table, and wherein said multiplicity of embossing tools includes five movable embossing tools and a lower embossing tool being immovably secured to said table and forming a lower boundary of said working position.

9. Apparatus according to claim 4, wherein said multiplicity of embossing tools includes a middle set of embossing tools and a lower embossing tool, said middle set of embossing tools including separate identical holding, activating and securing means, and said upper and lower tool heads and said ball guiding element include separate identical operating, holding and vertical guide means.

10. Apparatus according to claim 4, including piston and cylinder means for moving said embossing tools.

* * * * *